United States Patent
Cochrane et al.

(10) Patent No.: US 11,238,209 B2
(45) Date of Patent: Feb. 1, 2022

(54) SYSTEMS AND METHODS FOR VIEWING AND EDITING COMPOSITE DOCUMENTS

(71) Applicant: ORACLE INTERNATIONAL CORPORATION, Redwood Shores, CA (US)

(72) Inventors: Neil Cochrane, Alameda, CA (US); Michael Yawn, Marietta, GA (US); Campegius Bronkhorst, Tucson, AZ (US)

(73) Assignee: Oracle International Corporation, Redwood Shores, CA (US)

( * ) Notice: Subject to any disclaimer, the term of this patent is extended or adjusted under 35 U.S.C. 154(b) by 28 days.

(21) Appl. No.: 16/702,259

(22) Filed: Dec. 3, 2019

(65) Prior Publication Data

US 2020/0104344 A1 Apr. 2, 2020

Related U.S. Application Data

(63) Continuation of application No. 14/171,081, filed on Feb. 3, 2014, now Pat. No. 10,534,844.

(51) Int. Cl.
*G06F 17/00* (2019.01)
*G06F 40/106* (2020.01)
(Continued)

(52) U.S. Cl.
CPC .......... *G06F 40/106* (2020.01); *G06F 40/137* (2020.01); *G06F 40/166* (2020.01)

(58) Field of Classification Search
CPC ..... G06F 40/166; G06F 40/137; G06F 40/106
See application file for complete search history.

(56) References Cited

U.S. PATENT DOCUMENTS 5,333,312 A 7/1994 Wang et al.
5,838,319 A 11/1998 Guzak et al.
(Continued)

FOREIGN PATENT DOCUMENTS

| EP | 0809197 A2 | 11/1997 |
| EP | 0902380 A2 | 3/1999 |
| WO | 2005008376 A3 | 1/2005 |

OTHER PUBLICATIONS

About Composite documents and IDF http://www.pclviewer.com/help/index.html?about_composite_documents.htm, retrieved on Sep. 26, 2013.
(Continued)

*Primary Examiner* — Mohammed H Zuberi
(74) *Attorney, Agent, or Firm* — Kilpatrick Townsend & Stockton LLP

(57) ABSTRACT

Embodiments of the present invention are directed to creating, viewing, and/or editing a composite document. A composite document can be created based on a base document. The base document can include references to content in reference documents. References can be identified based on reference definitions, and reference data can be extracted from the reference document and embedded into the base document. A control mark can be added to the base document corresponding to the reference. A user can select the control mark to display or hide the embedded reference data. This adds the relevant referenced content from the reference document to the base document. This allows the user to quickly and efficiently review the referenced content while viewing the base document, without the human and computing overhead required for the user to manually find the reference document and identify the relevant portion of the reference document.

18 Claims, 8 Drawing Sheets

(51) Int. Cl.
*G06F 40/137* (2020.01)
*G06F 40/166* (2020.01)

(56) References Cited

U.S. PATENT DOCUMENTS

| | | | |
|---|---|---|---|
| 5,878,421 A | 3/1999 | Ferrel et al. | |
| 5,907,837 A | 5/1999 | Ferrel et al. | |
| 6,199,082 B1 | 3/2001 | Ferrel et al. | |
| 6,230,173 B1 | 5/2001 | Ferrel et al. | |
| 6,366,923 B1* | 4/2002 | Lenk | G06F 16/957 707/706 |
| 6,522,342 B1* | 2/2003 | Gagnon | H04H 60/25 715/716 |
| 6,538,673 B1* | 3/2003 | Maslov | G06F 16/958 715/853 |
| 6,556,984 B1* | 4/2003 | Zien | G06F 16/955 |
| 6,631,496 B1* | 10/2003 | Li | G06F 16/9562 715/200 |
| 6,718,365 B1* | 4/2004 | Dutta | G06F 16/951 709/203 |
| 6,745,178 B1* | 6/2004 | Emens | G06F 16/951 707/741 |
| 6,763,388 B1* | 7/2004 | Tsimelzon | G06F 16/9577 709/228 |
| 6,763,399 B2* | 7/2004 | Margalit | G06F 21/34 710/13 |
| 6,976,210 B1 | 12/2005 | Silva et al. | |
| 7,058,902 B2* | 6/2006 | Iwema | G06F 3/0488 345/156 |
| 7,206,839 B2* | 4/2007 | Ingram | G06F 16/957 709/224 |
| 7,360,175 B2* | 4/2008 | Gardner | G06F 3/0482 715/825 |
| 7,401,128 B1* | 7/2008 | Mueller | G06F 16/9577 709/217 |
| 7,478,336 B2* | 1/2009 | Chen | G06F 40/166 715/770 |
| 7,536,433 B2 | 5/2009 | Reilly | |
| 7,558,853 B2* | 7/2009 | Alcorn | G09B 5/02 434/322 |
| 7,702,811 B2* | 4/2010 | Gopalan | G06F 16/9562 709/245 |
| 7,899,829 B1* | 3/2011 | Malla | G06F 16/9562 707/741 |
| 8,060,514 B2* | 11/2011 | Arrouye | G06F 16/10 707/741 |
| 8,468,244 B2 | 6/2013 | Redlich et al. | |
| 8,639,694 B1 | 1/2014 | Wolfe et al. | |
| 8,676,797 B2 | 3/2014 | Rohrs et al. | |
| 8,863,013 B2 | 10/2014 | Eischeid et al. | |
| 10,275,430 B2 | 4/2019 | Mullins et al. | |
| 2002/0005867 A1* | 1/2002 | Gvily | G06F 16/958 715/760 |
| 2003/0007013 A1 | 1/2003 | Gatis | |
| 2003/0101412 A1* | 5/2003 | Eid | G06F 16/972 715/234 |
| 2003/0126560 A1* | 7/2003 | Kurapati | G06F 16/9562 715/206 |
| 2003/0214529 A1* | 11/2003 | Martin, Jr. | H04L 67/04 715/738 |
| 2004/0044691 A1 | 3/2004 | Wajda | |
| 2004/0177323 A1* | 9/2004 | Kaasila | G09G 5/28 715/201 |
| 2004/0205493 A1* | 10/2004 | Simpson | G06F 16/957 715/205 |
| 2004/0225716 A1* | 11/2004 | Shamir | H04L 67/02 709/204 |
| 2005/0033657 A1* | 2/2005 | Herrington | G06Q 30/0631 705/26.7 |
| 2005/0091609 A1* | 4/2005 | Matthews | G06F 3/0482 715/804 |
| 2005/0097190 A1* | 5/2005 | Abdelhak | G06F 16/954 709/217 |
| 2005/0102630 A1* | 5/2005 | Chen | G06F 40/151 715/770 |
| 2005/0149851 A1 | 7/2005 | Mittal | |
| 2005/0154994 A1* | 7/2005 | Chen | G06F 9/543 715/770 |
| 2005/0234904 A1* | 10/2005 | Brill | G06F 16/334 |
| 2005/0246540 A1* | 11/2005 | Brown | H04M 1/72436 713/176 |
| 2006/0015498 A1* | 1/2006 | Sarmiento | G06F 16/9535 |
| 2006/0026147 A1* | 2/2006 | Cone | G06F 16/9535 |
| 2006/0041589 A1* | 2/2006 | Heitman | G06F 16/958 |
| 2006/0085476 A1* | 4/2006 | Daniels | G06F 16/951 |
| 2006/0123053 A1 | 6/2006 | Scannell, Jr. | |
| 2006/0161859 A1* | 7/2006 | Holecek | G06F 3/048 715/781 |
| 2006/0224997 A1* | 10/2006 | Wong | G06F 16/9562 715/838 |
| 2006/0271834 A1* | 11/2006 | Wang | G06F 16/958 715/236 |
| 2006/0274086 A1* | 12/2006 | Forstall | G06F 16/958 345/629 |
| 2006/0277460 A1* | 12/2006 | Forstall | G06F 16/9577 715/234 |
| 2007/0011146 A1* | 1/2007 | Holbrook | G06F 16/958 |
| 2007/0106952 A1* | 5/2007 | Matas | G06F 16/9577 715/764 |
| 2007/0204211 A1 | 8/2007 | Paxson | |
| 2007/0266022 A1* | 11/2007 | Frumkin | G06F 3/0484 |
| 2007/0266342 A1* | 11/2007 | Chang | G06F 16/9535 715/810 |
| 2007/0300143 A1 | 12/2007 | Vanderport et al. | |
| 2008/0034317 A1* | 2/2008 | Fard | G06T 13/80 715/781 |
| 2008/0040359 A1* | 2/2008 | Arrouye | G06F 16/14 |
| 2008/0046825 A1* | 2/2008 | Bedi | G06F 16/958 715/742 |
| 2008/0046845 A1* | 2/2008 | Chandra | G06F 16/9577 715/856 |
| 2008/0086471 A1* | 4/2008 | Ritter | G06F 16/9562 |
| 2008/0168388 A1* | 7/2008 | Decker | G06F 40/117 715/800 |
| 2008/0201650 A1* | 8/2008 | Lemay | H04M 1/2746 715/763 |
| 2008/0209354 A1 | 8/2008 | Stanek et al. | |
| 2008/0235563 A1* | 9/2008 | Nakamura | G06F 3/0483 715/200 |
| 2008/0307301 A1* | 12/2008 | Decker | G06F 16/9577 715/241 |
| 2008/0307308 A1* | 12/2008 | Sullivan | G06F 16/9577 715/723 |
| 2008/0313722 A1* | 12/2008 | Cho | G06F 16/9562 726/7 |
| 2009/0024962 A1* | 1/2009 | Gotz | G06F 16/9562 715/838 |
| 2009/0044126 A1* | 2/2009 | Wyler | G06F 16/9577 715/734 |
| 2009/0044138 A1* | 2/2009 | Rudolph | G06F 16/958 715/765 |
| 2009/0119258 A1* | 5/2009 | Petty | G06Q 10/10 |
| 2009/0164887 A1* | 6/2009 | Ikegami | G06F 16/9577 715/247 |
| 2009/0164941 A1* | 6/2009 | Johnson | G06F 11/3684 715/810 |
| 2010/0060945 A1 | 3/2010 | Asano | |
| 2010/0229081 A1 | 9/2010 | Rothbucher | |
| 2010/0250497 A1 | 9/2010 | Redlich et al. | |
| 2011/0082849 A1* | 4/2011 | Rakowski | G06F 16/951 707/706 |
| 2012/0030213 A1* | 2/2012 | Arrouye | G06F 16/10 707/741 |
| 2012/0072847 A1* | 3/2012 | Lee | G06F 16/9535 715/738 |
| 2012/0191716 A1 | 7/2012 | Omoigui | |
| 2013/0007578 A1 | 1/2013 | Shreck et al. | |
| 2013/0007581 A1 | 1/2013 | Shreck et al. | |
| 2013/0055167 A1 | 2/2013 | Leong et al. | |
| 2013/0067584 A1 | 3/2013 | Wiseman | |

(56) References Cited

U.S. PATENT DOCUMENTS

| | | | | |
|---|---|---|---|---|
| 2013/0212463 | A1* | 8/2013 | Pachikov | G06F 40/10 |
| | | | | 715/234 |
| 2014/0195593 | A1* | 7/2014 | Somerfield | G06F 9/468 |
| | | | | 709/203 |
| 2015/0220491 | A1 | 8/2015 | Cochrane et al. | |
| 2015/0363478 | A1 | 12/2015 | Haynes | |
| 2017/0352172 | A1 | 12/2017 | Lim et al. | |

OTHER PUBLICATIONS

Merge multiple files into one PDF file with Adobe Acrobat XI http://www.adobe.com/content/dam/Adobe/en/products/acrobat/pdfs/adobe-acrobat-xi-merge-pdf-files-tutorial-ue.pdf.

Creating Custom Text Editors and Designers http://msdn.microsoft.com/en-us/library/bb166329.aspx, retrieved on Sep. 26, 2013.

Inside the Core Editor http://msdn.microsoft.com/en-us/library/bb165971.aspx, retrieved on Sep. 26, 2013.

Document providers and documents http://help.eclipse.org/indigo/index.jsp?topic=%2Forg.eclipse.platform.doc.isv%2Fguide%2Feditors_documents.htm, retrieved on Sep. 26, 2013.

Microsoft Word—Editing Your Document http://www.mediacollege.com/microsoft/word/editing.html, retrieved on Sep. 26, 2013.

Advisory Action for U.S. Appl. No. 14/171,081 dated Oct. 3, 2018, 6 pages.

Final Office Action for U.S. Appl. No. 14/171,081 dated May 15, 2019, 41 pages.

Final Office Action for U.S. Appl. No. 14/171,081 dated Mar. 24, 2017, 58 pages.

Final Office Action for U.S. Appl. No. 14/171,081 dated Jun. 8, 2018, 61 pages.

Final Office Action for U.S. Appl. No. 14/171,081 dated May 4, 2016, 64 pages.

Non-Final Office Action for U.S. Appl. No. 14/171,081 dated Aug. 29, 2016, 52 pages.

Non-Final Office Action for U.S. Appl. No. 14/171,081 dated Dec. 1, 2015, 54 pages.

Non-Final Office Action for U.S. Appl. No. 14/171,081 dated Dec. 12, 2018, 66 pages.

Non-Final Office Action for U.S. Appl. No. 14/171,081 dated Nov. 13, 2017, 66 pages.

Notice of Allowance for U.S. Appl. No. 14/171,081 dated Sep. 5, 2019, 10 pages.

* cited by examiner

A.java 300

```
protected List<JavaItem> createInsigtDataItems( Output output,
                                    JavaPackage packagePrimary
                                    JavaHasType hasTypePrimary )
{
    List<JavaItem> items = super.createInsightDataItems(output, packagePrimary,
hasTypePrimary);
    List<JavaItem> allItems = new ArrayList<JavaItem>();

boolean useDiamond = false;
    ...
}
```

302

A.java 300

```
protected List<JavaItem> createInsightDataItems( Output output,
                                    JavaPackage packagePrimary
                                    JavaHasType hasTypePrimary )
{
    List<JavaItem> items = super.createInsightDataItems(output, packagePrimary,
hasTypePrimary);
```

306

B.java 304

```
protected List<JavaItem> createInsightDataItems( Output output,
                                    JavaPackage packagePrimary,
                                    JavaHasType hasTypePrimary )
{
    final ArrayList<JavaElement> list = output.all;
    final List<JavaItem> outList = new
        ArrayList<JavaItem>(list.size());

for (JavaElement javaElement : list)
        outList.add(new JavaItem( javaElement ));

return outList;
}
```

310

308

```
    List<JavaItem> allItems = new ArrayList<JavaItem>();

boolean useDiamond = false;
    ...
}
```

FIG. 3

A.java 300 protected List<JavaItem> createInsigtDataItems( Output output,
                                     JavaPackage packagePrimary
                                     JavaHasType hasTypePrimary )
{
   List<JavaItem> items = super.createInsightDataItems(output, packagePrimary, hasTypePrimary);

306 —

B.java 304 protected List<JavaItem> createInsightDataItems( Output output,
                                   JavaPackage packagePrimary,
                                   JavaHasType hasTypePrimary )
    {
       final ArrayList<JavaElement> list = output.all;
       final List<JavaItem> outList = new
           ArrayList<JavaItem>(list.size());

for (JavaElement javaElement : list)
402 —       outList.add(new JavaItem( javaElement ));

C.java 400 public boolean add(E e) {
        ensureCapacityInternal(size + 1);
        elementData[size++] = e;
        return true;
    } return outList;
    }

List<JavaItem> allItems = new ArrayList<JavaItem>();

boolean useDiamond = false;

SYSTEMS AND METHODS FOR VIEWING AND EDITING COMPOSITE DOCUMENTS

CROSS REFERENCE TO RELATED APPLICATIONS

This application is a continuation of U.S. patent application Ser. No. 14/171,081, filed on Feb. 3, 2014, the entire disclosure of which is incorporated herein by reference in its entirety for all purposes.

BACKGROUND OF THE INVENTION

When creating a document, a user may make references to content in other documents e.g. citations, quotes, computer code. For example, in source code development, a user may be viewing one document, such as one source file in a project, but that source file may also reference code from other documents. Academic and legal writings may include references to other documents that support or are otherwise relevant to a particular point being made by the author. Typically if a user wants to access one of the referenced documents, the user must manually locate and view the referenced document. For example, in a computer-based environment, the user may open the referenced document in a new window or tab. Similarly if the referenced document references still other documents, the process continues with the user opening additional documents in additional tabs or windows. This process is generally unwieldy. Automatic solutions may identify the referenced document, but still either require the entire referenced document to be viewed, or a section of the referenced document can be rendered in a pop-up window or by some other mechanism that does not embed the reference directly in the document. Although this may save the user time in retrieving the correct document, the user is still left with a cluttered, difficult to navigate, workspace that likely displays much more information than is relevant. Additionally, the user may not be able to make changes to referenced documents without opening each referenced document, leading to the same cluttered and difficult to manage environment.

BRIEF SUMMARY OF THE INVENTION

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

Embodiments of the present invention are directed to creating, viewing, and/or editing a composite document. A composite document can be created based on a source document, also referred to herein as a base document. The base document can include references to content in different documents, referred to herein as reference documents. References can be made according to a defined reference definition. When a reference is identified, reference data can be extracted from the reference document and embedded into the base document. A control mark can be added to the base document corresponding to the reference. A user can select the control mark to display the reference data embedded in the composite document. This adds the relevant referenced content from the reference document to the base document. This allows the user to quickly and efficiently review the referenced content while viewing the base document, without the human and computing overhead required for the user to manually find the reference document and identify the relevant portion of the reference document. In some embodiments, the embedded content can be edited in the composite document, and changes made to the embedded content can be applied to the reference document. In some embodiments, embedded content can include one or more references to other reference documents. Content corresponding to these references can be embedded within the embedded content, e.g., a composite document can include embedded referenced content that can be nested within other referenced content resulting in a multi-level composite document.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

Illustrative embodiments of the present invention are described in detail below with reference to the following drawing figures:

FIG. 3 depicts an example of a base document and a composite document, in accordance with an embodiment of the invention.

FIG. 4 depicts an example of a composite document with multiple levels of embedded references, in accordance with an embodiment of the invention.

DETAILED DESCRIPTION

In the following description, for the purposes of explanation, specific details are set forth in order to provide a thorough understanding of embodiments of the invention. However, it will be apparent that various embodiments may be practiced without these specific details. The figures and description are not intended to be restrictive.

Systems depicted in some of the figures may be provided in various configurations. In some embodiments, the systems may be configured as a distributed system where one or more components of the system are distributed across one or more networks in a cloud computing system.

Embodiments of the present invention are directed to creating, viewing, and/or editing a composite document. A composite document can be created based on a source document, also referred to herein as a base document. The base document can include references to content in different documents or parts of the same document, referred to herein as reference documents. References can be made according to a defined reference definition. When a reference is identified, reference data can be extracted from the reference document and embedded into the base document. A control mark can be added to the base document corresponding to the reference. A user can select the control mark to display the reference data embedded in the composite document. This adds the relevant referenced content from the reference document to the base document. This allows the user to quickly and efficiently review the referenced content while viewing the base document, without the human and computing overhead required for the user to manually find the reference document and identify the relevant portion of the reference document. In some embodiments, the embedded content can be edited in the composite document, and changes made to the embedded content can be applied to the reference document. In some embodiments, embedded content from a reference document may not be editable. For example, web content identified and embedded based on a URL reference may not be editable. In some embodiments, embedded content can include one or more references to other reference documents. Content corresponding to these references can be embedded within the embedded content, e.g., a composite document can include embedded referenced content that can be nested within other referenced content resulting in a multi-level composite document that presents a unified view of the referenced content. Content can be nested to N levels, subject to available system resources and user preferences.

Figure 1:
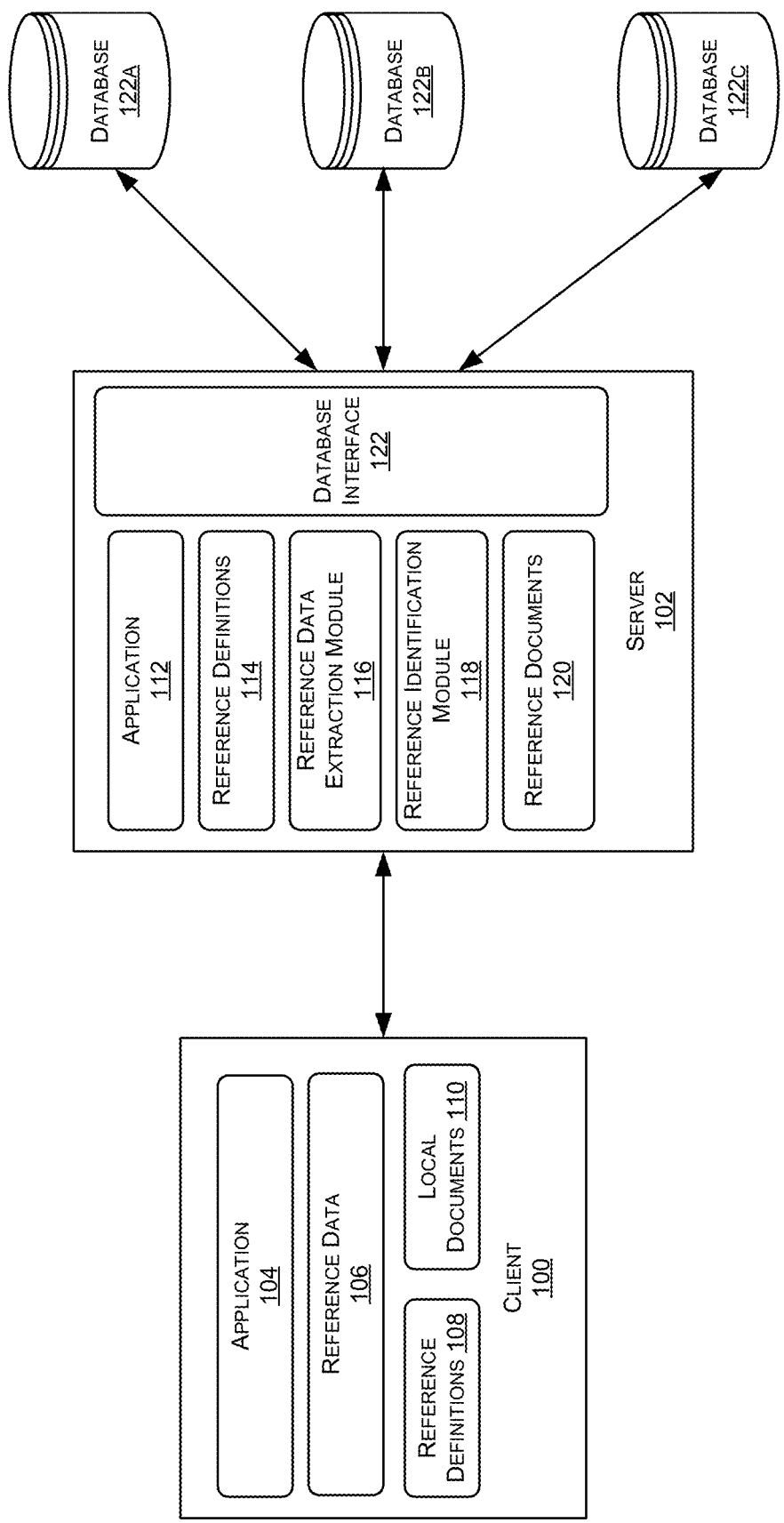
FIG. 1 illustrates a system in which composite documents can be generated, edited, and/or viewed, in accordance with an embodiment of the invention.

FIG. 1 illustrates a system in which composite documents can be generated, edited, and/or viewed, in accordance with an embodiment of the invention. Although particular functionality is shown as divided between client 100 and server 102, this division is for the ease of description and does not represent the only possible embodiment of the present invention. As shown in FIG. 1, in a distributed environment, a client computer 100 can communicate with a server computer 102 over a network, such as an intranet or internet, to create, edit, and/or view documents. An application 104, can enable a user to create, edit, and/or view documents that are locally or remotely accessible to the client 100. In some embodiments, the application 104 can include an editor application, such as a software development application that can be used to create and edit documents, e.g. Visual Studio, Eclipse, or any other integrated development environment (IDE) application. In some embodiments, application 104 can include document viewing and/or editing software, examples of which include Microsoft Word and Adobe Reader. In some embodiments, application 104 can be a web browser through which the user can access a web application 112 executing remotely on server 102 or on another server in a cloud computing environment.

A user can open a base document in the application 104 from a local document store 110 or remotely from server 102 which can access one or more databases 122A, 122B, 122C via a database interface 122, or other accessible data store. The application 102 can automatically identify references in the base document when it is opened using reference definitions 106. Application 102 can match content in the base document to the reference definitions 106. For example, where the base document is software source code, the source code can be analyzed and references found to source code in other source files. In some embodiments, client 100 can maintain reference definitions 106 locally provided by a user and/or received from server 102. In some embodiments, reference definitions 108 can include recently used reference definitions, with less frequently used reference definitions 114 stored at server 102.

Once a reference is identified, the application 104 can send a request to server 102 to parse the reference to identify a reference identifier and a content identifier. In some embodiments, the application 104 can parse the reference itself. The reference identifier can include a reference title, reference location, and/or any other information that can be used to identify a reference document. The content identifier can indicate a relevant portion of the reference, such as a page/paragraph number, method name, or other identifier. For example, a reference can be a citation such as a legal or scientific citation, that identifies a title of the reference and page information according to a defined format. In some embodiments, the reference can be a hypertext link, or similar link, that links to the referenced content and may include a content identifier in the hypertext link. The application can use the reference identifier to locate the reference document and extract relevant data from the reference (e.g., the data corresponding to the pages included in the reference). The application can query a local document store 110 using the reference identifier to determine whether a copy of the reference document is stored locally. If a copy is not stored locally, the application 104 can send a request to server 102 to identify the reference document. A reference identification module 118 at server 102 can query a reference document store 120 and one or more databases using the reference identifier to identify the reference document. The reference identification module 118 can also identify and retrieve web content using the reference identifier. In some embodiments, where the reference is a hypertext link, the content can be retrieved from the linked location by following the hypertext link.

When a reference document is located, a relevant portion of the reference document's content can be extracted. For example, server 102 includes a reference data extraction module 116 that can copy content from a reference document and send the content to application 104 to be embedded in a composite document. The application can embed the extracted reference data into the composite document and associate a control mark with the embedded content. The control mark can be selected by the user to show or hide the embedded content in the composite document.

In some embodiments, when the base document is saved, all changes made to embedded content is saved to each corresponding reference document. In some embodiments, when an embedded document is closed, e.g., when an open control mark is selected, any changes made to the embedded content can be saved to the corresponding reference document automatically, or the user can be prompted to save or discard changes. In some embodiments, a composite document's state can be saved by the application such that when a composite document is closed and subsequently reopened, embedded content will be returned to its previous state. For example, if user closes a composite document that includes three references with associated embedded content where embedded content is shown for a first reference and hidden for the other two references, when the user later reopens the composite document the first reference's embedded content will automatically be shown and the other two references' content hidden.

Figure 2:
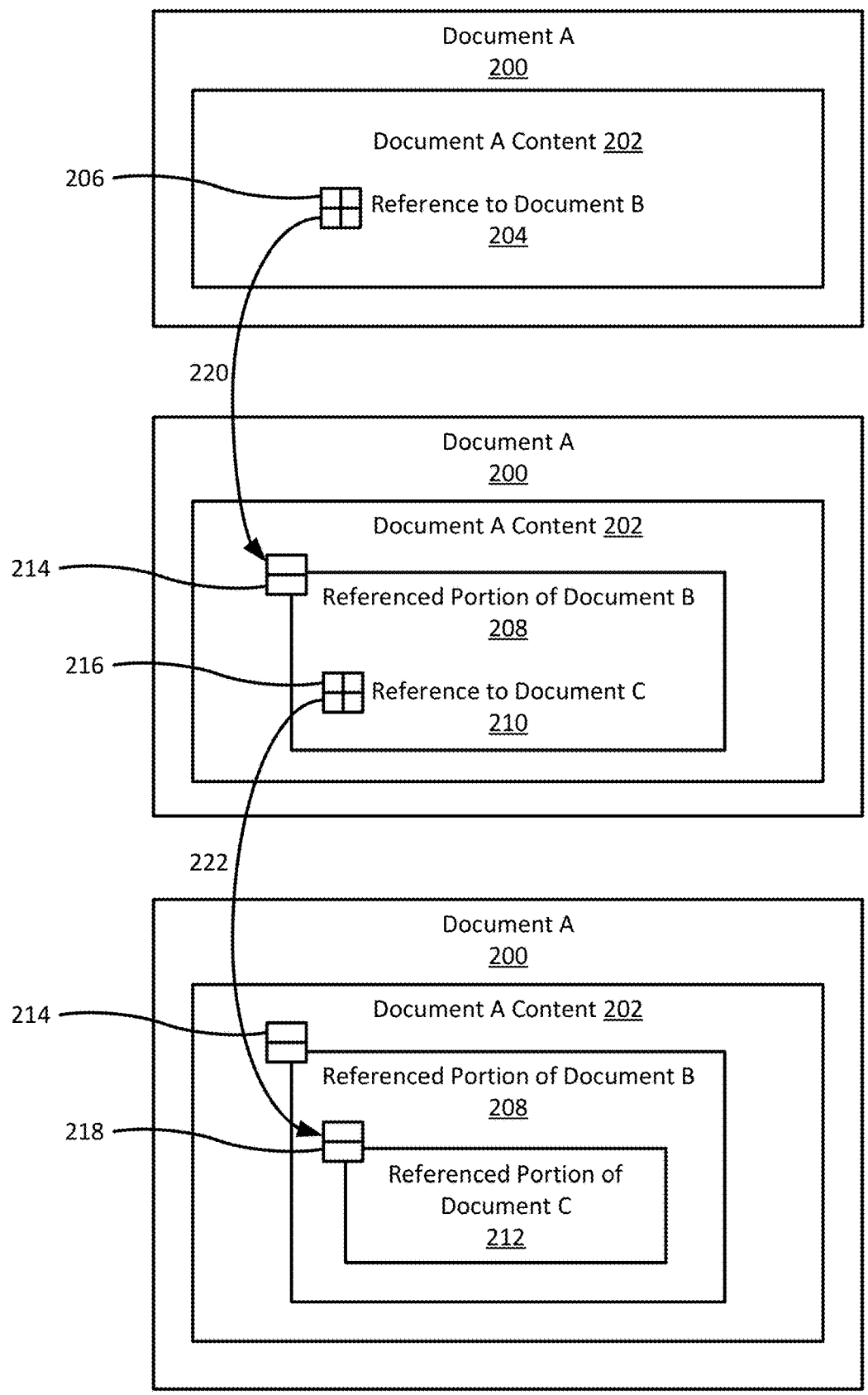
FIG. 2 depicts a generic composite document, in accordance with an embodiment of the invention.

FIG. 2 depicts a generic composite document, in accordance with an embodiment of the invention. As shown in FIG. 2, a base document, Document A 200, can be opened in an application by a user. Document A 200 can include content (e.g., text, images, software code, etc.) which can include references to other documents. In this example the Document A content includes a reference to Document B 204. As described above, the application can automatically identify the reference to Document B 204 based on reference definitions accessible to the application. The application can insert a control mark 206 corresponding to the reference to Document B 204. The control mark 206 is selectable and can be used to hide or show the referenced portion of Document B 208. Once control mark 206 is selected 220, control mark 214 is opened and the referenced portion of Document B 208 is embedded in Document A 200. As shown in FIG. 2, the referenced portion of Document B 208 can be embedded in-line with the Document A content 202.

As described above, referenced portions of documents can also include references to other documents. As shown in FIG. 2, the reference portion of Document B 208 includes a reference to Document C 210 and a corresponding control mark 216. When the user selects control mark 216, control mark 218 is opened and the referenced portion of Document C 212 is embedded in-line with the referenced portion of Document B 208.

In some embodiments, the user can manually add a reference mark to a base document when the user adds a reference to the content of the base document. When the user adds the reference mark, the user can specify the portion of the reference document to be embedded, e.g. the user can browse and select the reference document and the portion of the reference document. In some embodiments, when user selects a control mark, the application can display options to select a portion of the reference document to embed. For example, a URL reference may not specify a particular portion of web content to embed. Instead, the reference content can be displayed and the user can select a portion to embed. In some embodiments, the application can automatically select and embed a portion of the reference document, and the user can be presented with the option to select a different portion to embed.

FIG. 3 depicts an example of a base document and a composite document, in accordance with an embodiment of the invention. As shown in FIG. 3, a base document, Java source code file A.java 300, is opened in an application, e.g., an integrated development environment (IDE). File A.java 300 includes a call to a method in its superclass, super.createInsightDataItems( ). The IDE can automatically identify the method call as a reference to superclass B.java 304 and extract the portion of B.java corresponding to this method. When the user selects closed control mark 302 it can be opened 306 and the relevant portion of B.java 304 can be embedded in A.java 300. The relevant createInsightDataItems method includes a call to the method add in the class of variable outList. The IDE can automatically recognize this call as a reference to the portion of the class variable outList that includes the method add, extract the relevant portion, and add control mark 308. Any changes the user makes to the embedded portion of B.java 304 in A.java 300 can be saved to B.java. As described above, changes can be saved when the embedded portion of B.java is closed by selecting control mark 306 and/or when A.java is saved.

In some embodiments, embedded content can be called out, e.g. using a different font, highlight, or other callout. For example, as shown in FIG. 3, the embedded portion of B.java 304 is called out by shaded box 310. In some embodiments, embedded content can be made to visually match the base document without any callout. In some embodiments, embedded content can be viewed in an overlay visualization on the base document such as a pop-up or floating visualization.

FIG. 4 depicts an example of a composite document with multiple levels of embedded references, in accordance with an embodiment of the invention. As shown in FIG. 4, the user has selected control mark 308 (of FIG. 3) to embed a portion of C.java 400 into the embedded portion of B.java 304. The embedded portion of C.java can be automatically identified by the IDE to include the add method called in the embedded portion of B.java 304. Any changes the user makes to the embedded portion of C.java 400 in A.java 300 can be saved to C.java. As described above, changes can be saved when the embedded portion of C.java is closed by selecting control mark 402, when the embedded portion of B.java 304 is closed by selecting control mark 306, and/or when A.java is saved.

Figure 5:
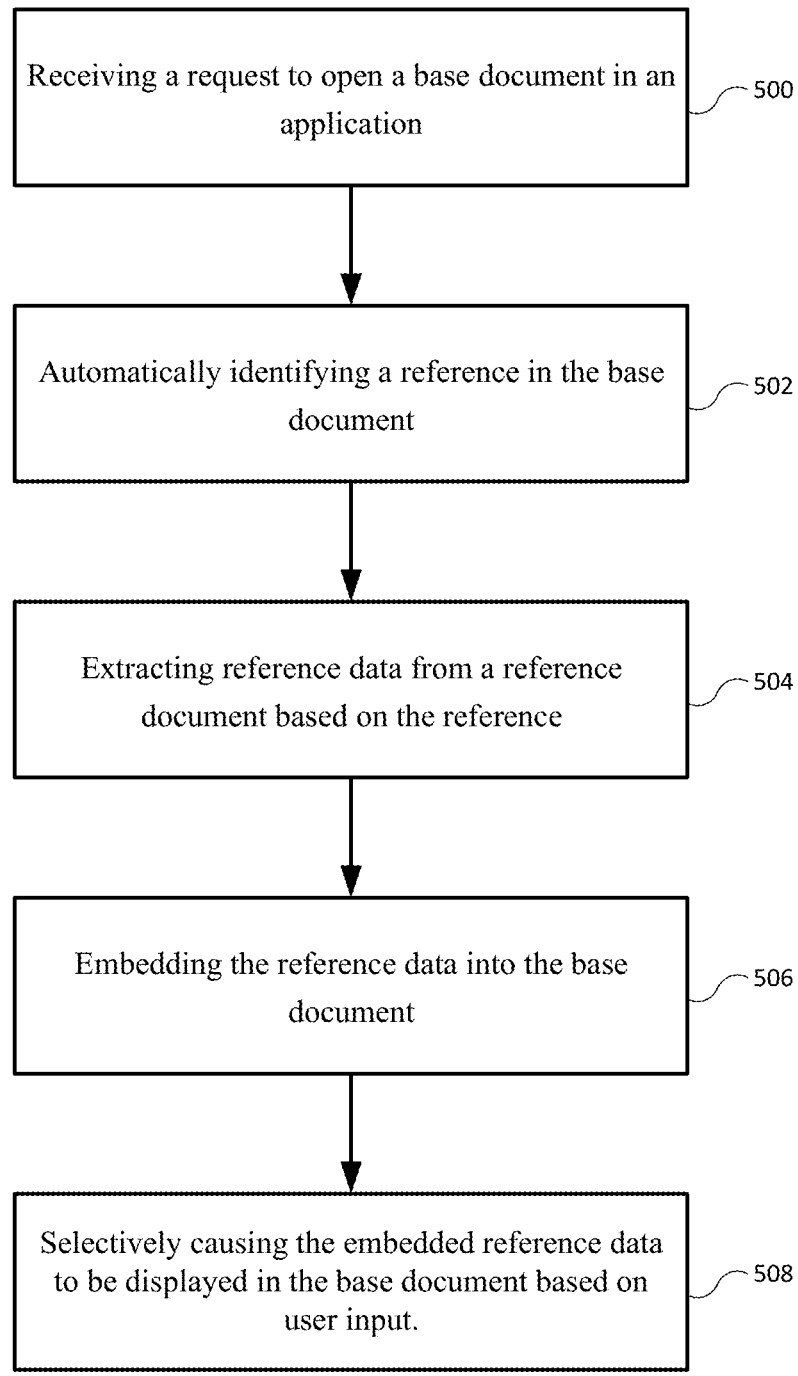
FIG. 5 depicts a method of automatically generating a composite document, in accordance with an embodiment of the invention.

FIG. 5 depicts a method of automatically generating a composite document, in accordance with an embodiment of the invention. At block 500, a request is received to open a base document in an application. For example, a user can open a source code file in an IDE or a word processing document in an editor. At block 502, a reference is automatically identified in the base document. References can be identified based on reference definitions. In some embodiments, automatically identifying a reference in the base document can include analyzing content of the base document, comparing the content of the base document to a reference definition, and identifying a portion of the base document that matches the reference definition as the reference. For example, references to methods or classes in a source code file can be identified based on how those references are defined in a particular programming language. Similarly, legal, academic, and other citations typically follow particular citation formatting rules. These rules can be characterized as a reference definition that defines how a particular reference indicates a reference identifier, such as a title or location of a reference document, and a content identifier, such as relevant page numbers of a cited portion of the reference document, and other information.

At block 504, once the reference document has been identified, reference data is extracted from the reference document based on the reference. For example, where the reference is a call to a particular method of a particular class the extracted portion may be the method definition from the particular class. At block 506, the reference data, corresponding to the relevant portion of the reference document is embedded into the base document to create a composite document. At block 508, the embedded reference data can be selectively displayed in the base document based on user input.

In some embodiments, the application can receive a request to display the embedded reference data in the base document and a request to change to the embedded reference data. Any changes made to the embedded reference data can be saved to the reference document. In some embodiments, the application can automatically identify additional references to the same or different reference documents. The application can extract the additional reference data based on the additional references, and embed the additional reference data into the base document.

Figure 6:
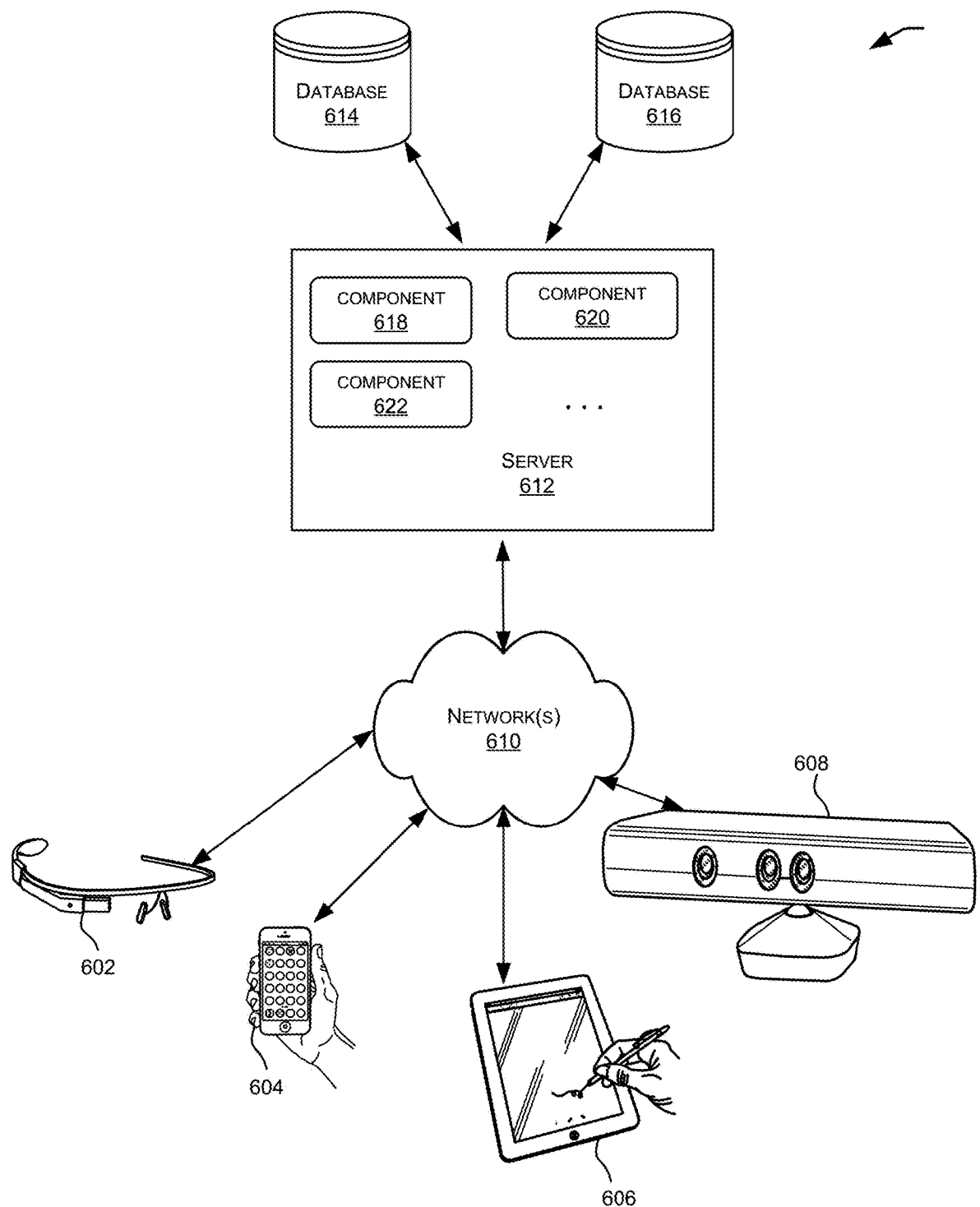
FIG. 6 depicts a simplified diagram of a distributed system for implementing one of the embodiments.

FIG. 6 depicts a simplified diagram of a distributed system 600 for implementing one of the embodiments. In the illustrated embodiment, distributed system 600 includes one or more client computing devices 602, 604, 606, and 608, which are configured to execute and operate a client application such as a web browser, proprietary client (e.g., Oracle Forms), or the like over one or more network(s) 610. Server 612 may be communicatively coupled with remote client computing devices 602, 604, 606, and 608 via network 610.

In various embodiments, server 612 may be adapted to run one or more services or software applications provided by one or more of the components of the system. In some embodiments, these services may be offered as web-based or cloud services or under a Software as a Service (SaaS) model to the users of client computing devices 602, 604, 606, and/or 608. Users operating client computing devices 602, 604, 606, and/or 608 may in turn utilize one or more client applications to interact with server 612 to utilize the services provided by these components.

In the configuration depicted in the figure, the software components 618, 620 and 622 of system 600 are shown as being implemented on server 612. In other embodiments, one or more of the components of system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in the figure is thus one example of a distributed system for implementing an embodiment system and is not intended to be limiting.

Client computing devices 602, 604, 606, and/or 608 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 602, 604, 606, and 608 may be any other electronic device, such as a thin-client computer, an Internet-enabled gaming system (e.g., a Microsoft Xbox gaming console with or without a Kinect® gesture input device), and/or a personal messaging device, capable of communicating over network(s) 610.

Although exemplary distributed system 600 is shown with four client computing devices, any number of client computing devices may be supported. Other devices, such as devices with sensors, etc., may interact with server 612.

Network(s) 610 in distributed system 600 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 610 can be a local area network (LAN), such as one based on Ethernet, Token-Ring and/or the like. Network(s) 610 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 612 may be adapted to run one or more services or software applications described in the foregoing disclosure. For example, server 612 may correspond to a server for performing processing described above according to an embodiment of the present disclosure.

Server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 612 may include one or more applications to analyze and consolidate data feeds and/or event updates received from users of client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 612 may also include one or more applications to display the data feeds and/or real-time events via one or more display devices of client computing devices 602, 604, 606, and 608.

Distributed system 600 may also include one or more databases 614 and 616. Databases 614 and 616 may reside in a variety of locations. By way of example, one or more of databases 614 and 616 may reside on a non-transitory storage medium local to (and/or resident in) server 612. Alternatively, databases 614 and 616 may be remote from server 612 and in communication with server 612 via a network-based or dedicated connection. In one set of embodiments, databases 614 and 616 may reside in a storage-area network (SAN). Similarly, any necessary files for performing the functions attributed to server 612 may be stored locally on server 612 and/or remotely, as appropriate. In one set of embodiments, databases 614 and 616 may include relational databases, such as databases provided by Oracle, that are adapted to store, update, and retrieve data in response to SQL-formatted commands.

Figure 7:
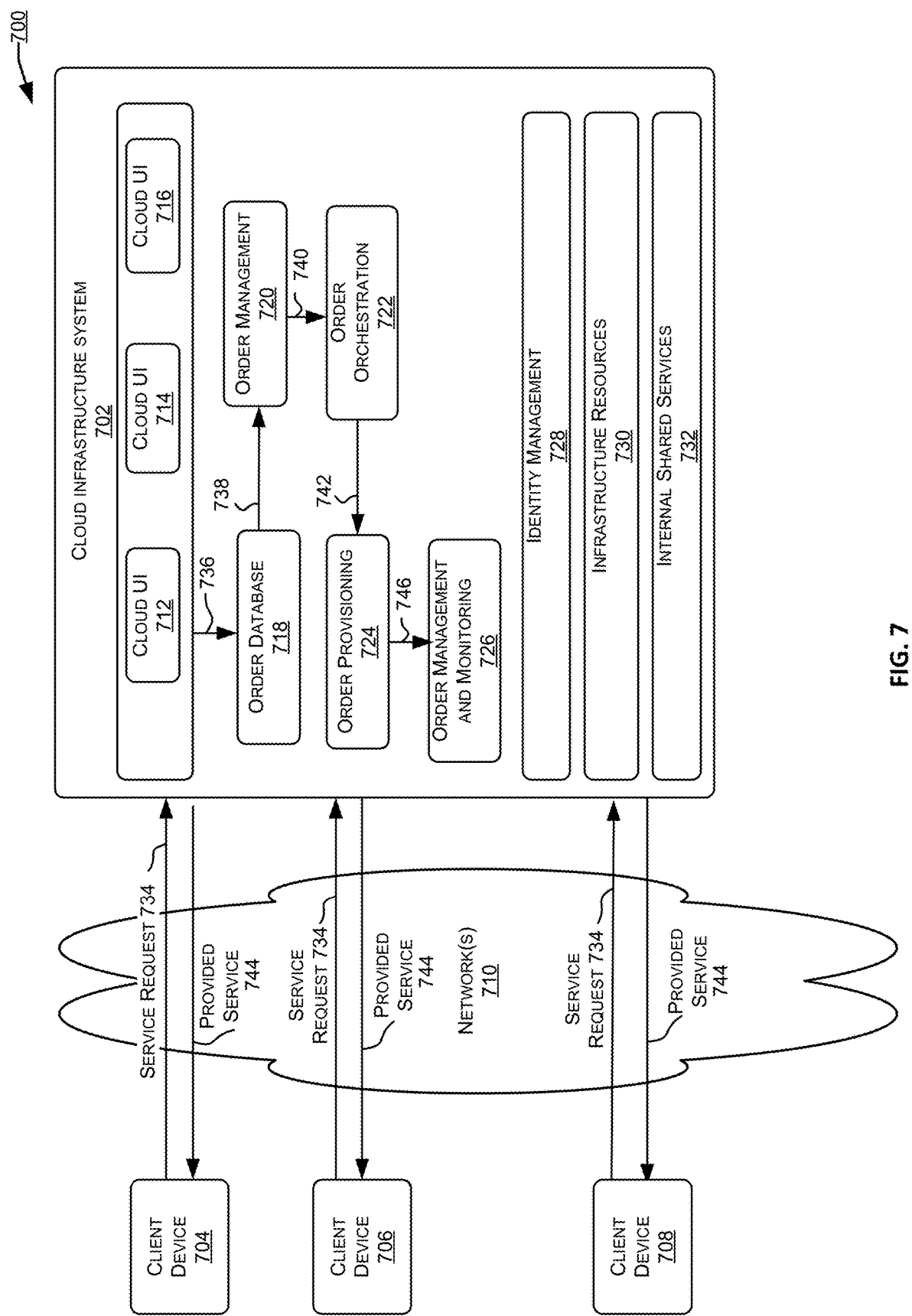
FIG. 7 is a simplified block diagram of components of a system environment by which services provided by the components of an embodiment system may be offered as cloud services, in accordance with an embodiment of the present disclosure.

FIG. 7 is a simplified block diagram of one or more components of a system environment 700 by which services provided by one or more components of an embodiment system may be offered as cloud services, in accordance with an embodiment of the present disclosure. In the illustrated embodiment, system environment 700 includes one or more client computing devices 704, 706, and 708 that may be used by users to interact with a cloud infrastructure system 702 that provides cloud services. The client computing devices may be configured to operate a client application such as a web browser, a proprietary client application (e.g., Oracle Forms), or some other application, which may be used by a user of the client computing device to interact with cloud infrastructure system 702 to use services provided by cloud infrastructure system 702.

It should be appreciated that cloud infrastructure system 702 depicted in the figure may have other components than those depicted. Further, the embodiment shown in the figure is only one example of a cloud infrastructure system that may incorporate an embodiment of the invention. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608.

Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

Cloud infrastructure system 702 may comprise one or more computers and/or servers that may include those described above for server 612.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 and by the services provided by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in the figure, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In exemplary operation 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI), cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

After an order has been placed by the customer, the order information is received via the cloud UIs, 712, 714 and/or 716.

At operation 736, the order is stored in order database 718. Order database 718 can be one of several databases operated by cloud infrastructure system 702 and operated in conjunction with other system elements.

At operation 738, the order information is forwarded to an order management module 720. In some instances, order management module 720 may be configured to perform billing and accounting functions related to the order, such as verifying the order, and upon verification, booking the order.

At operation 740, information regarding the order is communicated to an order orchestration module 722. Order orchestration module 722 may utilize the order information to orchestrate the provisioning of services and resources for the order placed by the customer. In some instances, order orchestration module 722 may orchestrate the provisioning of resources to support the subscribed services using the services of order provisioning module 724.

In certain embodiments, order orchestration module 722 enables the management of business processes associated with each order and applies business logic to determine whether an order should proceed to provisioning. At operation 742, upon receiving an order for a new subscription, order orchestration module 722 sends a request to order provisioning module 724 to allocate resources and configure those resources needed to fulfill the subscription order. Order provisioning module 724 enables the allocation of resources for the services ordered by the customer. Order provisioning module 724 provides a level of abstraction between the cloud services provided by cloud infrastructure system 702 and the physical implementation layer that is used to provision the resources for providing the requested services. Order orchestration module 722 may thus be isolated from implementation details, such as whether or not services and resources are actually provisioned on the fly or pre-provisioned and only allocated/assigned upon request.

At operation 744, once the services and resources are provisioned, a notification of the provided service may be sent to customers on client devices 704, 706 and/or 708 by order provisioning module 724 of cloud infrastructure system 702.

At operation 746, the customer's subscription order may be managed and tracked by an order management and monitoring module 726. In some instances, order management and monitoring module 726 may be configured to collect usage statistics for the services in the subscription order, such as the amount of storage used, the amount data transferred, the number of users, and the amount of system up time and system down time.

In certain embodiments, cloud infrastructure system 702 may include an identity management module 728. Identity management module 728 may be configured to provide identity services, such as access management and authorization services in cloud infrastructure system 702. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
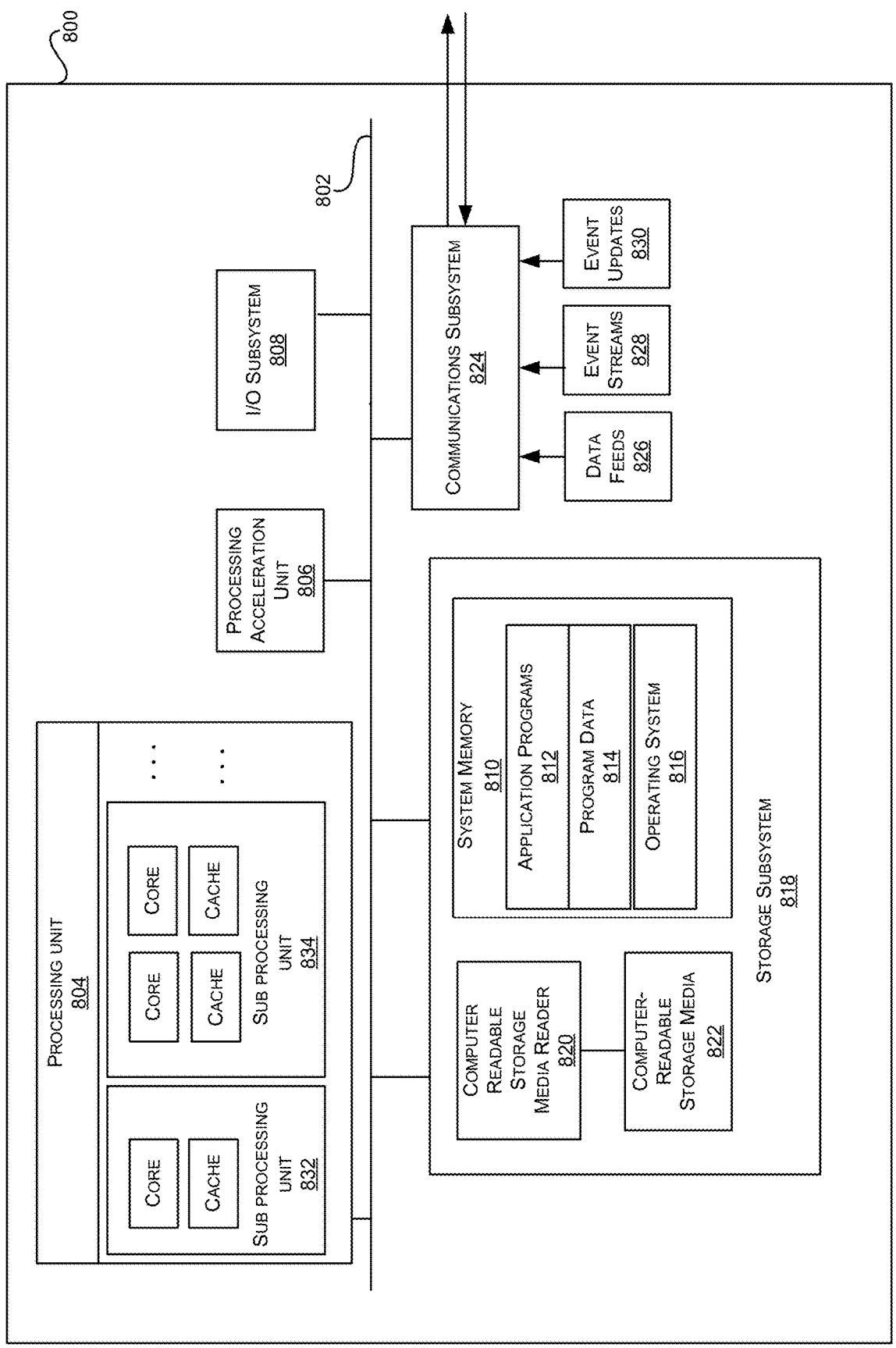
FIG. 8 illustrates an exemplary computer system, in which various embodiments of the present invention may be implemented.

FIG. 8 illustrates an exemplary computer system 800, in which various embodiments of the present invention may be implemented. The system 800 may be used to implement any of the computer systems described above. As shown in the figure, computer system 800 includes a processing unit 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 includes tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 804, which can be implemented as one or more integrated circuits (e.g., a conventional microprocessor or microcontroller), controls the operation of computer system 800. One or more processors may be included in processing unit 804. These processors may include single core or multicore processors. In certain embodiments, processing unit 804 may be implemented as one or more independent processing units 832 and/or 834 with single or multicore processors included in each processing unit. In other embodiments, processing unit 804 may also be implemented as a quad-core processing unit formed by integrating two dual-core processors into a single chip.

In various embodiments, processing unit 804 can execute a variety of programs in response to program code and can maintain multiple concurrently executing programs or processes. At any given time, some or all of the program code to be executed can be resident in processor(s) 804 and/or in storage subsystem 818. Through suitable programming, processor(s) 804 can provide various functionalities described above. Computer system 800 may additionally include a processing acceleration unit 806, which can include a digital signal processor (DSP), a special-purpose processor, and/or the like.

I/O subsystem 808 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 800 may comprise a storage subsystem 818 that comprises software elements, shown as being currently located within a system memory 810. System memory 810 may store program instructions that are loadable and executable on processing unit 804, as well as data generated during the execution of these programs.

Depending on the configuration and type of computer system 800, system memory 810 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 804. In some implementations, system memory 810 may include multiple different types of memory, such as static random access memory (SRAM) or dynamic random access memory (DRAM). In some implementations, a basic input/output system (BIOS), containing the basic routines that help to transfer information between elements within computer system 800, such as during start-up, may typically be stored in the ROM. By way of example, and not limitation, system memory 810 also illustrates application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 818 may also provide a tangible computer-readable storage medium for storing the basic programming and data constructs that provide the functionality of some embodiments. Software (programs, code modules, instructions) that when executed by a processor provide the functionality described above may be stored in storage subsystem 818. These software modules or instructions may be executed by processing unit 804. Storage subsystem 818 may also provide a repository for storing data used in accordance with the present invention.

Storage subsystem 800 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for temporarily and/or more permanently containing, storing, transmitting, and retrieving computer-readable information.

Computer-readable storage media 822 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 800.

By way of example, computer-readable storage media 822 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 800.

Communications subsystem 824 provides an interface to other computer systems and networks. Communications subsystem 824 serves as an interface for receiving data from and transmitting data to other systems from computer system 800. For example, communications subsystem 824 may enable computer system 800 to connect to one or more devices via the Internet. In some embodiments communications subsystem 824 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

In some embodiments, communications subsystem 824 may also receive input communication in the form of structured and/or unstructured data feeds 826, event streams 828, event updates 830, and the like on behalf of one or more users who may use computer system 800.

By way of example, communications subsystem 824 may be configured to receive data feeds 826 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 824 may also be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 800 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   receiving, by a processor, a request to open a base document in an application;
   automatically identifying a reference to content in a reference document in the base document, wherein the reference identifies a portion of the reference document to be extracted;
   extracting reference data from the reference document based on the reference, wherein the reference comprises a reference identifier that identifies the reference data to be extracted from the reference document;
   embedding the reference data extracted from the reference document into the base document in order to create a multi-level composite document comprising a plurality of levels of embedded content, wherein the content of the embedded reference data extracted from the reference document is configured to be editable after being embedded into the base document;
   inserting a control mark at a location for each of the embedded reference data in the multi-level composite document; and
   selectively causing the embedded reference data to be displayed in the base document at the location of the embedded reference data based on a user input of selecting the control mark.

2. The method of claim 1, further comprising:
   receiving a request to display the embedded reference data in the base document;
   receiving a request to change the embedded reference data; and
   saving changes to the embedded reference data to the reference document.

3. The method of claim 1, wherein automatically identifying the reference in the base document further comprises:
   analyzing content of the base document;
   comparing the content of the base document to a reference definition; and
   identifying a portion of the base document that matches the reference definition as the reference.

4. The method of claim 3, wherein the reference definition includes the reference identifier corresponding to the reference document and a content identifier corresponding to the reference data.

5. The method of claim 1, further comprising:
   automatically identifying one or more additional references to one or more additional reference documents;
   extracting additional reference data based on the one or more additional references; and
   embedding the additional reference data into the base document, wherein the additional reference data is editable.

6. The method of claim 5, wherein at least one additional reference is automatically identified in the embedded reference data, and wherein the additional reference data corresponding to the at least one additional reference is embedded within the embedded reference data.

7. The method according to claim 1, wherein the embedded reference data comprises a file including a call to a method in an integrated development environment (IDE), and wherein the file is configured to be editable.

8. A non-transitory computer readable storage medium including instructions stored thereon which, when executed by a processor, cause the processor to:
   receive a request to open a base document in an application;
   automatically identify a reference to content in a reference document in the base document, wherein the reference identifies a portion of the reference document to be extracted;
   extract reference data from the reference document based on the reference, wherein the reference comprises a reference identifier that identifies the reference data to be extracted from the reference document;
   embed the reference data extracted from the reference document into the base document in order to create a multi-level composite document comprising a plurality of levels of embedded content, wherein the content of the embedded reference data extracted from the reference document is configured to be editable after being embedded into the base document;
   inserting a control mark at a location for each of the embedded reference data in the multi-level composite document; and
   selectively cause the embedded reference data to be displayed in the base document at the location of the embedded reference data based on a user input of selecting the control mark.

9. The non-transitory computer readable storage medium of claim 8, wherein the instructions stored on the non-transitory computer readable storage medium, when executed by the processor, further cause the processor to:
   receiving a request to display the embedded reference data in the base document;
   receiving a request to change the embedded reference data; and saving changes to the embedded reference data to the reference document.

10. The non-transitory computer readable storage medium of claim 8, wherein automatically identifying the reference in the base document further comprises:
analyzing content of the base document;
comparing the content of the base document to a reference definition; and
identifying a portion of the base document that matches the reference definition as the reference.

11. The non-transitory computer readable storage medium of claim 10, wherein the reference definition includes the reference identifier corresponding to the reference document and a content identifier corresponding to the reference data.

12. The non-transitory computer readable storage medium of claim 8, wherein the instructions stored on the non-transitory computer readable storage medium, when executed by the processor, further cause the processor to:
automatically identifying one or more additional references to one or more additional reference documents;
extracting additional reference data based on the one or more additional references; and
embedding the additional reference data into the base document, wherein the additional reference data is editable.

13. The non-transitory computer readable storage medium of claim 12, wherein at least one additional reference is automatically identified in the embedded reference data, and wherein the additional reference data corresponding to the at least one additional reference is embedded within the embedded reference data.

14. A system, comprising:
a server, including a computer readable medium and processor, wherein the server comprises a plurality of reference definitions, a reference data extraction module, and a reference identification module; and
wherein the server is configured to:
receive from a client a request to open a base document in an application;
automatically identify a reference to content in a reference document in the base document using the reference identification module, wherein the reference identifies a portion of the reference document to be extracted;
extract reference data from the reference document based on the reference using the reference data extraction module, wherein the reference comprises a reference identifier that identifies the reference data to be extracted from the reference document;
embed the reference data extracted from the reference document into the base document in order to create a multi-level composite document comprising a plurality of levels of embedded content, wherein the content of the embedded reference data extracted from the reference document is configured to be editable after being embedded into the base document;
inserting a control mark at a location for each of the embedded reference data in the multi-level composite document; and
selectively cause the embedded reference data to be displayed in the base document at the location of the embedded reference data based on a user input of selecting the control mark.

15. The system of claim 14, wherein the server is further configured to:
receive a request to display the embedded reference data in the base document;
receive a request to change the embedded reference data; and
save changes to the embedded reference data to the reference document.

16. The system of claim 14, wherein automatically identifying the reference in the base document further comprises:
analyzing content of the base document;
comparing the content of the base document to a reference definition from the plurality of reference definitions; and
identifying a portion of the base document that matches the reference definition as the reference.

17. The system of claim 16, wherein the reference definition includes the reference identifier corresponding to the reference document and a content identifier corresponding to the reference data.

18. The system of claim 14, wherein the server is further configured to:
automatically identify one or more additional references to one or more additional reference documents;
extract additional reference data based on the one or more additional references; and
embed the additional reference data into the base document, wherein the additional reference data is editable.

* * * * *

UNITED STATES PATENT AND TRADEMARK OFFICE
CERTIFICATE OF CORRECTION

PATENT NO. : 11,238,209 B2
APPLICATION NO. : 16/702259
DATED : February 1, 2022
INVENTOR(S) : Cochrane et al.

It is certified that error appears in the above-identified patent and that said Letters Patent is hereby corrected as shown below:

On the Title Page

On page 2, Column 2, under U.S. Patent Documents, Line 8, delete "Heitman" and insert -- Helfman --, therefor.

Signed and Sealed this
Twenty-fourth Day of May, 2022

Katherine Kelly Vidal
*Director of the United States Patent and Trademark Office*